US006493732B2

(12) United States Patent
Aoyama et al.

(10) Patent No.: US 6,493,732 B2
(45) Date of Patent: *Dec. 10, 2002

(54) METHOD OF AND AN APPARATUS FOR DISPLAYING VERSION INFORMATION AND CONFIGURATION AND A COMPUTER-READABLE RECORDING MEDIUM ON WHICH A VERSION AND CONFIGURATION INFORMATION DISPLAY PROGRAM IS RECORDED

(75) Inventors: Yuki Aoyama, Sagamihara (JP); Toru Takahashi, Sagamihara (JP); Satoshi Wakayama, Sakai (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/946,345

(22) Filed: Sep. 6, 2001

(65) Prior Publication Data

US 2002/0007365 A1 Jan. 17, 2002

Related U.S. Application Data

(63) Continuation of application No. 09/185,646, filed on Nov. 4, 1998, now Pat. No. 6,301,592.

(30) Foreign Application Priority Data

Nov. 5, 1997 (JP) ........................................ 9-319011

(51) Int. Cl.[7] ........................................ G06F 17/21

(52) U.S. Cl. ........................ 707/511; 707/526; 707/515

(58) Field of Search ........................ 707/500, 511, 707/517, 530, 531, 526

(56) References Cited

U.S. PATENT DOCUMENTS

| | | | | |
|---|---|---|---|---|
| 5,553,216 | A | 9/1996 | Yoshioka et al. | 707/515 |
| 5,671,428 | A | 9/1997 | Muranaga et al. | 345/329 |
| 5,745,686 | A | 4/1998 | Saito et al. | 717/11 |
| 5,819,295 | A | 10/1998 | Nakagawa et al. | 707/203 |
| 5,890,176 | A | 3/1999 | Kish et al. | 707/511 |
| 5,983,242 | A | 11/1999 | Brown et al. | 707/203 |
| 6,112,024 | A | 8/2000 | Almond et al. | 395/703 |
| 6,301,592 | B1 | 10/2001 | Aoyama et al. | 707/511 |

*Primary Examiner*—Stephen S. Hong

(74) *Attorney, Agent, or Firm*—Antonelli,Terry, Stout & Kraus, LLP

(57) ABSTRACT

Each time a document or a program source is edited, version information including its version name and creation date is stored in a storage. Configuration information of a plurality of documents and program sources is stored in another storage. The version and configuration information is read from the storages such that information of constituent elements of a project such as documents and program sources is placed in a vertical direction and version information of the elements is placed by use of a creation date as a reference in a horizontal direction for a two-dimensional display thereof. With the configuration, there is provided a display method of clearly presenting to the user a display image in which version information is combined with configuration information.

24 Claims, 17 Drawing Sheets

FIG. 6

CONTENTS (mokuji . txt)

601

| VERSION | CREATOR | CREATION DATE | ....... |
|---|---|---|---|
| V1 | TARO HEISEI | 1997.12.2 14:44 | |
| V2 | TARO HEISEI | 1997.12.5 18:57 | |

605 606 607

CHAPTER 1 (chap 1.txt)

602

| VERSION | CREATOR | CREATION DATE | ....... |
|---|---|---|---|
| V1 | JIRO TAISHO | 1997.12.2 16:46 | |
| V2 | JIRO TAISHO | 1997.12.3 19:25 | |
| V3 | JIRO TAISHO | 1997.12.8 10:43 | |
| V4 | JIRO TAISHO | 1997.12.9 9:06 | |

CHAPTER 2 (chap 2.txt)

603

| VERSION | CREATOR | CREATION DATE | ....... |
|---|---|---|---|
| V1 | HANAKO SHOWA | 1997.12.2 13:42 | |
| V2 | HANAKO SHOWA | 1997.12.8 20:36 | |

FIG 1 (fig 1.txt)

604

| VERSION | CREATOR | CREATION DATE | ....... |
|---|---|---|---|
| V1 | JIRO TAISHO | 1997.12.2 15:21 | |
| V2 | JIRO TAISHO | 1997.12.3 19:53 | |
| V3 | JIRO TAISHO | 1997.12.8 11:17 | |

701

| PRODUCT XX MANUAL | | |
|---|---|---|
| CONSTITUENT ELEMENT NAME | FILE NAME | ........ |
| CONTENTS | mokuji.txt | |
| CHAPTER 1 | chap1.txt | |
| CHAPTER 1 | chap2.txt | |
| FIG. 1 | fig1.bmp | |

| PRODUCT XX MANUAL - FIRST VERSION | | | |
|---|---|---|---|
| CONSTITUENT ELEMENT NAME | FILE NAME | VER. NAME | ......... |
| CONTENTS | mokuji.txt | V1 | |
| CHAPTER 1 | chap1.txt | V2 | |
| CHAPTER 1 | chap2.txt | V1 | |
| FIG. 1 | fig1.bmp | V2 | |

703 704 902

903

| PRODUCT XX MANUAL - SECOND VERSION | | | |
|---|---|---|---|
| CONSTITUENT ELEMENT NAME | FILE NAME | VER. NAME | ......... |
| CONTENTS | mokuji.txt | V2 | |
| CHAPTER 1 | chap1.txt | V4 | |
| CHAPTER 1 | chap2.txt | V2 | |
| FIG. 1 | fig1.bmp | V3 | |

703 704 904

2001 — PRODUCT XX MANUAL - SECOND VERSION

2002 — PRIMARY DEADLINE 12/5 | FINAL DEADLINE 12/9

| ELEMENT NAME | FILE NAME | VER. NAME | MODE | ......... |
|---|---|---|---|---|
| CONTENTS | mokuji.txt | V2 | DETERMINED | |
| CHAPTER 1 | chap1.txt | V3 | EDITING IN PROCESS | |
| CHAPTER 2 | chap2.txt | V2 | DETERMINED | |
| FIG .1 | fig1.bmp | V3 | DETERMINED | |

2003

FIG. 22 main.cpp

2201

| VERSION | PERSON-IN-CHARGE | CREATION DATE | ....... |
|---|---|---|---|
| V1 | ICHIRO SUZUKI | 1997.9.5 16:46 | |
| V2 | ICHIRO SUZUKI | 1997.9.9 19:25 | |
| V3 | JIRO SATO | 1997.9.12 10:43 | |
| V4 | JIRO SATO | 1997.9.16 9:06 | |

2201 2201 2201 output.cpp

2202

| VERSION | PERSON-IN-CHARGE | CREATION DATE | ....... |
|---|---|---|---|
| V1 | JIRO SATO | 1997.9.8 16:21 | |
| V2 | JIRO SATO | 1997.9.9 19:25 | |
| V3 | JIRO SATO | 1997.9.16 14:17 | |

prog.h

2203

| VERSION | PERSON-IN-CHARGE | CREATION DATE | ....... |
|---|---|---|---|
| V1 | ICHIRO SUZUKI | 1997.9.5 10:42 | |
| V2 | ICHIRO SUZUKI | 1997.9.12 9:36 | |

output.h

2204

| VERSION | PERSON-IN-CHARGE | CREATION DATE | ....... |
|---|---|---|---|
| V1 | JIRO SATO | 1997.9.8 20:44 | |
| V2 | JIRO SATO | 1997.9.9 121:57 | |

ABC PROGRAM

METHOD OF AND AN APPARATUS FOR DISPLAYING VERSION INFORMATION AND CONFIGURATION AND A COMPUTER-READABLE RECORDING MEDIUM ON WHICH A VERSION AND CONFIGURATION INFORMATION DISPLAY PROGRAM IS RECORDED

This is a continuation of parent application Ser. No. 09/185,646, filed Nov. 4, 1998, U.S. Pat. No. 6,301,592.

BACKGROUND AND SUMMARY OF THE INVENTION

The present invention relates to a document management system, and in particular, to a method of and an apparatus for displaying document management information as a set of elements including a plurality of documents and a plurality of programs, for example, version information of each element and configuration information of a set thereof and a computer-readable recording medium on which a program for displaying version and configuration information is recorded.

To manage a large volume of documents of a firm in a concentrated manner for efficient use thereof, there has been an increasing need of a document management system in which documents can be stored in a storage to be retrieved and read therefrom. Additionally, for example, to write documents for a large number of manuals and to develop programs, namely, for collaborative job which cannot be achieved by one person but by a plurality of people through a collaborative job, there has been a tendency of effectively utilizing the system above.

In such a collaborative job, in addition to management of versions of respective documents and programs, the persons concerned are required to collaboratively proceed the job while collaboratively managing the state and condition of writing documents. Consequently, in the document management system employed in the collaborative job, there are essentially required a version management function and a configuration management function.

In this connection, "version management" indicates management of information items such as a version number of a document or a program source and a creation date of each version such that when a user edits and updates documents and program sources, it is possible to store and to retrieve any version of documents and program sources.

Consequently, a list of version information can be displayed to restore a version of a document at an arbitrary point in the past or to obtain a process of editing operations in the past. Moreover, for an efficient editing operation, it is possible to extract and display differences between the versions.

In addition, "configuration management" means that files or objects in which documents and/or program sources are stored are gathered into sets of related elements for the management thereof. The elements may be constituent elements of documents and programs.

A set of these elements is called a project in some cases. For example, when editing a manual of a product in a file for each chapter, if relationships between the files are managed in the form of configuration information of a project "product manual", the related files can be gathered into a document when necessary.

Moreover, in a case of development of an application program, when relationships between the program sources and object files of respective modules are managed in the form of configuration information of a project "application program", it is possible, for example, to compile related files at a time.

In a document management system having the version and configuration management functions, when the user conducts operation to refer to version information for restoration of versions at an arbitrary point in the past, to know an editing process in the past, and to extract and display differences between versions, it is necessary for the system to present the version information to the user.

Additionally, when a user carries out operation to refer to configuration information to gather related document files into a document and to collect related program sources for compilation thereof, the system is required to present the configuration information to the user.

Furthermore, when the user desires to know information of the editing operation conducted in the past for documents and program sources of a project and information of relationships between versions of constituent elements, it is necessary to clearly present information in which version information is combined with configuration information. This is a function particularly required in a collaborative job such as a collaborative writing of documents and a collaborative development of programs.

In this situation, version information and configuration information are displayed by use of a tree structure in the conventional document management system or the like as shown in FIG. 5. For example, PVCS Version Manager (http://www.intersolv.co.jp/PVCS/main/Function/Vm.htm) of INTERSOLV discloses a technology in which program versions are managed to display source names of each program and versions thereof in a tree structure.

In a display of FIG. 5, there is presented a combination of version information shown in FIG. 6 and configuration information shown in FIG. 7. But, FIGS. 6 and 7 are not admitted as prior art.

In FIG. 7, 701 indicates a name of a project as an object of management and 702 denotes constituent elements of the project. Configuration information includes a file name 704 and the like corresponding to a constituent element name 703, and the example of FIG. 7 indicates that Project "Product XX Manual" has constituent elements "Contents", "Chapter 1", "Chapter 2", and "FIG. 1."

In FIG. 6, 601 to 604 indicate version information items respectively corresponding to constituent elements of "Product XX Manual". Each version information includes a version name 605, a creator or writer of the version 606, a creation date thereof 607, etc., and FIG. 6 expresses, for example, that "Contents" include two versions of V1 and V2 (601).

FIG. 5 includes a root node of tree 501 indicating the displayed project. A sub-node 502 thereof denotes a constituent element of the project. Furthermore, a sub-node 503 of the element indicates a list of versions of respective constituent elements.

As above, information in which version information is combined with configuration information is displayed in a tree structure. Consequently, the user can recognize documents and program source names of the pertinent project as well as versions thereof.

However, the method of displaying version information and configuration information in accordance with the conventional document management system is attended with the following problems.

A first problem will be now described.

In the restoration of a document at a point of time in the past in FIG. 5, assume an example of a case in which "Chapter 1" is restored for a point of time of Dec. 4, 1997.

In the conventional display method using the tree structure, there is provided a graphic user interface (GUI) as shown in FIG. 8 to obtain information of a creation date or the like of each version. That is, by pointing an arbitrary constituent element of a document, there is displayed a list of version information thereof.

In FIG. 8, version information 802 is displayed for "Chapter 1. Namely, it is only necessary to restore the document of V2 by referring to the information.

However, to restore "Contents" for Dec. 4, 1997 on which "Chapter 1" was of V2, there is required a comparison of the creation date by referring to version information of "Contents" in this case. That is, when only the display method of FIG. 5 is used, it cannot be known that which one of the versions of "Contents" was used for each version of "Chapter 1".

As above, in the conventional display method, it is not possible to recognize a relationship in time between constituent elements, i.e., how these mutually related elements were edited. Therefore, it is difficult for the user to conduct operation for the restoration of the elements of a project into documents at a point of time in the past.

Description will now be given of a second problem.

Assume an example of a case in which as a constituent element of a project, there is specified not only a document or a source file but also a particular version name of the element.

This is effective, for example, in a case of management in which when a project has a version and a product manual includes several documents as its constituent elements, a first version of product manual includes the constituent elements of a version and a second version thereof includes the elements of another version.

FIG. 9 is an example in which there is specified, in addition to the configuration information of FIG. 7, a particular version name of the constituent element.

FIG. 9 shows configuration information 901 of "first version" and configuration information 903 of "second version" of "Product XX Manual". Each information includes a version name (902, 904) for each element in addition to a constituent element name 703 and a file name 704 associated therewith. In short, 901 indicates that "first version" of "Product XX Manual" includes V1 of "Contents", V1 of "Chapter 1", V2 of "Chapter 2", and V1 of "FIG. 1" and 903 indicates that "second version" of "Product XX Manual" includes V2 of "Contents", V4 of "Chapter 1", V2 of "Chapter 2", and V3 of "FIG. 1".

Configuration information of FIG. 9 is displayed in a tree structure, for example, as shown in FIG. 10.

In FIG. 10, a root node of tree 1001 represents a project. A sub-node 1002 thereof indicates a constituent element of the project and a sub-node 1003 of the element denotes a version name corresponding to each element.

However, in the display method above, although it is possible to know a version corresponding to each constituent element, the user cannot obtain, for example, how the version is edited before and/or after a particular point of time.

For example, "Contents" of "first version" of "Product XX Manual" is of V1 in the example of FIG. 10. However, there cannot be attained information of whether or not the Contents are edited thereafter and hence the position or the like of the version of the project cannot be known. That is, there exists a problem that information about versions of constituent elements of a project and historical information of editing of each version from another version cannot be obtained.

It is therefore an object of the present invention, which copes with the problems above, to provide a method of displaying version information and configuration information in which information of combination of version information and configuration information is clearly presented to the user such that the user refers to version information of documents and program sources of a project to easily restore versions of all elements of the project at an arbitrary point of time in the past and to easily obtain an editing process of each version in the past.

To achieve the object above, in accordance with one aspect of the present invention, there is provided a version and configuration information display method for use with a document management system including a processor, a storage, and a terminal unit for managing version information of documents, program sources, etc. and configuration information including a plurality of documents, a plurality of program sources, etc., including the steps of storing, each time a document, a program source, and the like is edited, version information including a version name thereof, a creation date thereof, and the like in the storage; storing configuration information of a project in a set of a plurality of documents, a plurality of program sources, and the like in the storage; and reading the version information and the configuration information of the project from the storage, placing and displaying information of constituent elements of a project including documents, program sources, and the like on a screen of the terminal unit in a vertical direction, and placing and displaying version information of each of the constituent elements thereon by using the creation date as a reference in a horizontal direction.

Moreover, the display step uses, in place of the creation date, a version of a project as the reference.

Additionally, the display step includes, in place of the step of placing and displaying information of constituent elements of a project including documents, program sources, etc. in a vertical direction, the step of placing and displaying information of constituent elements of a project including documents, program sources, etc. in a tree structure in a vertical direction in accordance with a hierarchical relationship between the constituent elements.

The display includes the step of storing, in the storage, job management information for inspection of a state of writing an entire project and documents as its elements and a state of developing program sources. The display step reads the job management information from the storage and places and displays the job management information on the screen of the terminal unit.

BRIEF DESCRIPTION OF THE DRAWINGS

FIG. 6 is a diagram showing an example of version information to explain an embodiment in accordance with the present invention;

FIG. 9 is a diagram showing an example of configuration information to explain a second embodiment in accordance with the present invention;

FIG. 22 is a diagram showing a display example of version information to explain a fourth embodiment in accordance with the present invention;

DESCRIPTION OF THE PREFERRED EMBODIMENTS

Next, description will be given of an embodiment in accordance with the present invention.

Figure 1:
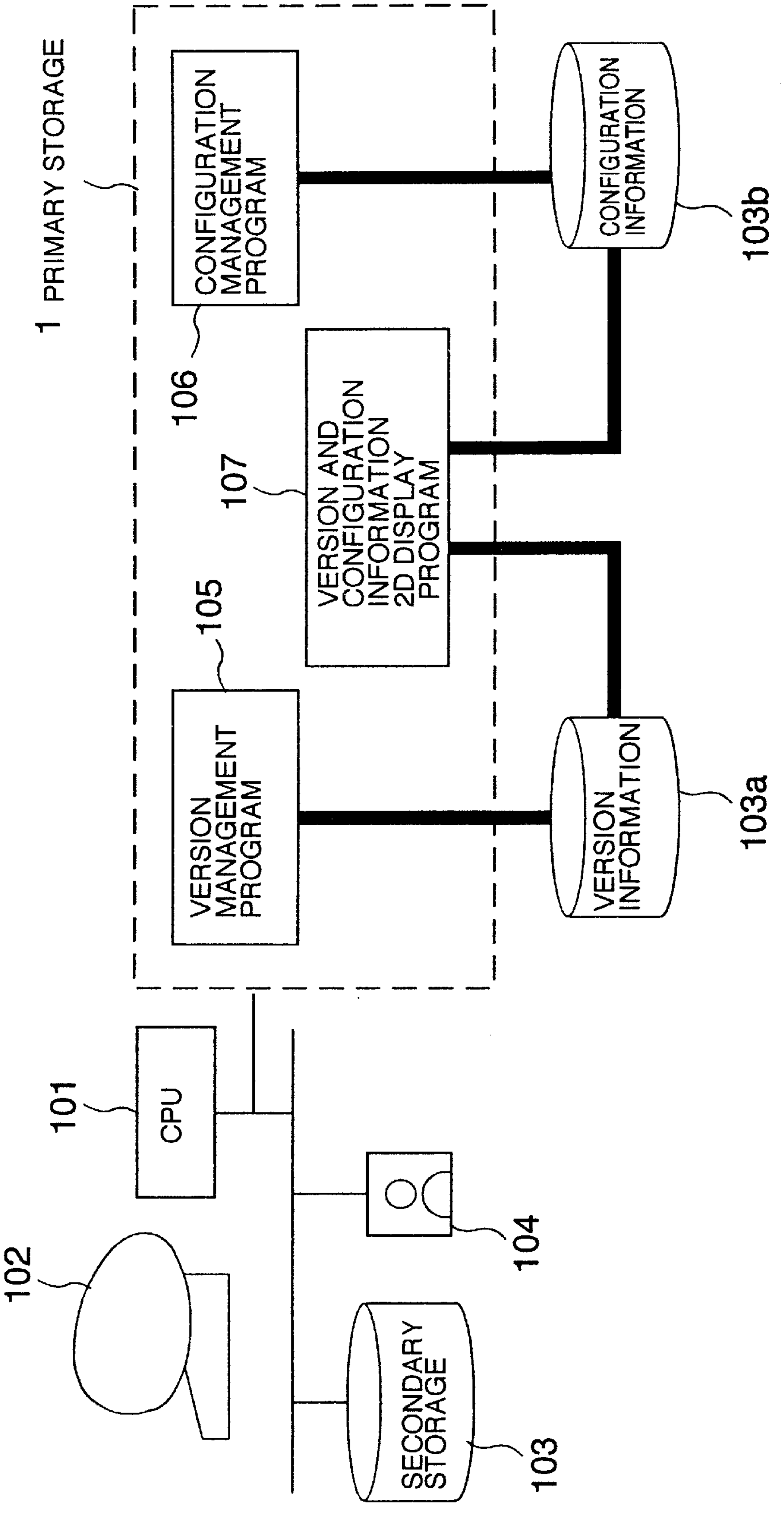
FIG. 1 is a diagram showing constitution of a first embodiment in accordance with the present invention.

FIG. 1 shows constitution of a first embodiment of the present invention.

As can be seen from the diagram, the embodiment includes a CPU 101, a terminal unit 102, a secondary storage 103, a storage medium 104 for storing programs thereon, and a processing program 1 for conducting version management and configuration management and displaying information about versions and configurations.

Additionally, the processing program 1 includes a version management program 105 to store, each time a document or a program source is edited, version information including a version name and a creation date thereof in the secondary storage 103, a configuration management program 106 to store project configuration information 103*b* in the secondary storage 103, the information 103*b* including a set of a plurality of documents and a plurality of program sources, and a version/configuration information two-dimensional (2D) display program 107 to place or to arrange, when the version information 103*a* and the configuration information 103*b* are read from the storage 103 for the display thereof, information of constituent elements such as documents and program sources of a project in a vertical direction of a two-dimensional plane and version information of the elements in a horizontal direction in accordance with the creation date to thereby display these items in the two-dimensional manner.

A specific processing procedure of this embodiment will be described by referring to the flowcharts of FIGS. 2 to 4. Moreover, the version information of FIG. 6 and the configuration information of FIG. 7 are used in this example of processing.

Figures 7, 8:
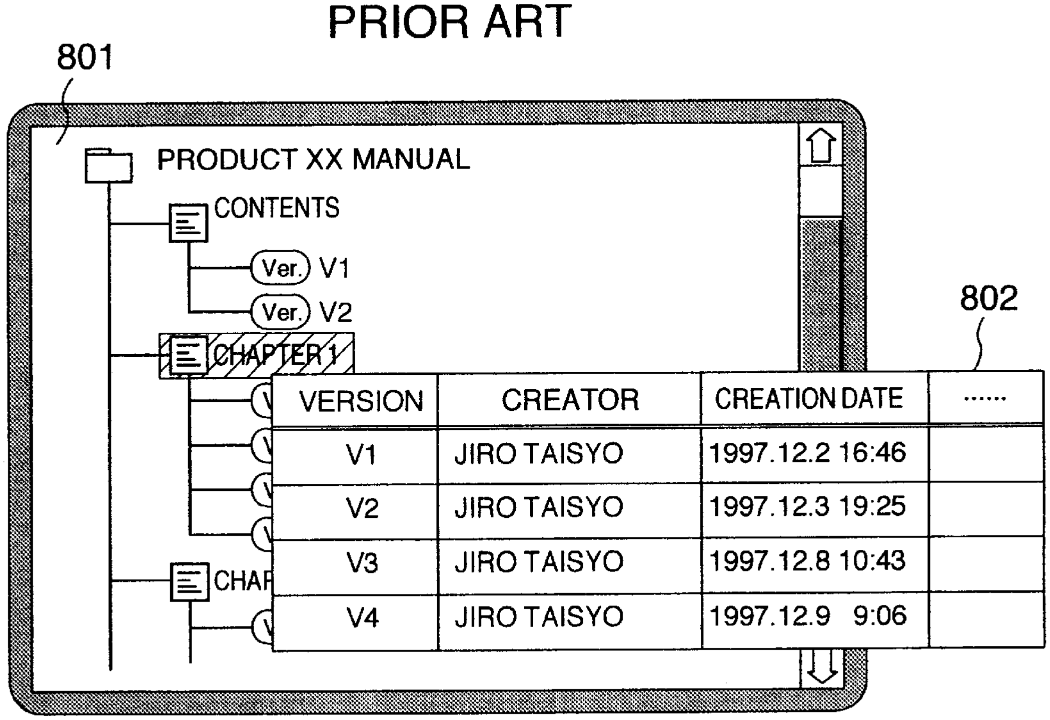
FIG. 7 is a diagram showing an example of configuration information to explain a first embodiment in accordance with the present invention.
FIG. 8 is a diagram showing a state of referring to version information in a conventional display method.
Figure 10:
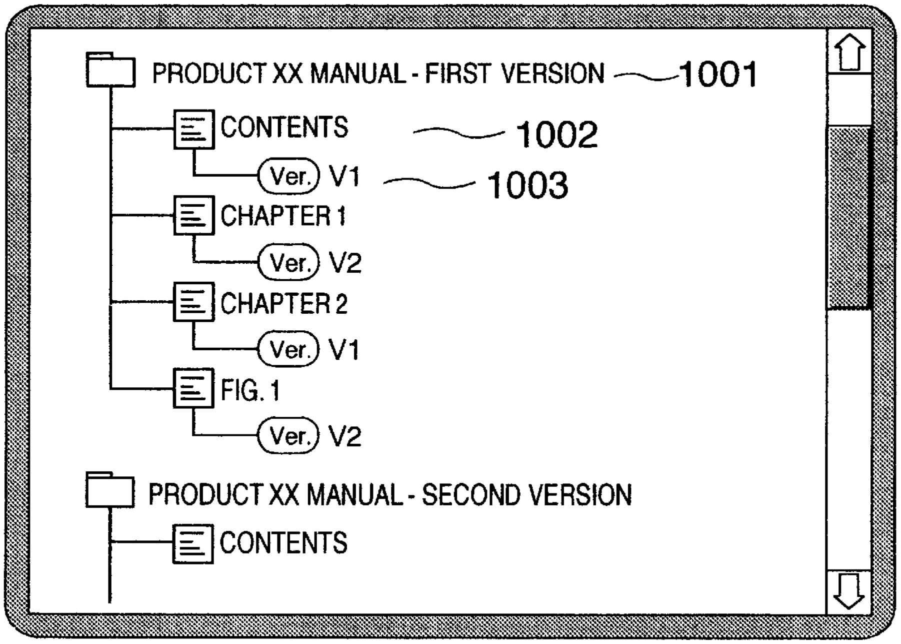
FIG. 10 is a diagram showing a second display example of version information and configuration information in a conventional display method.
Figure 11:
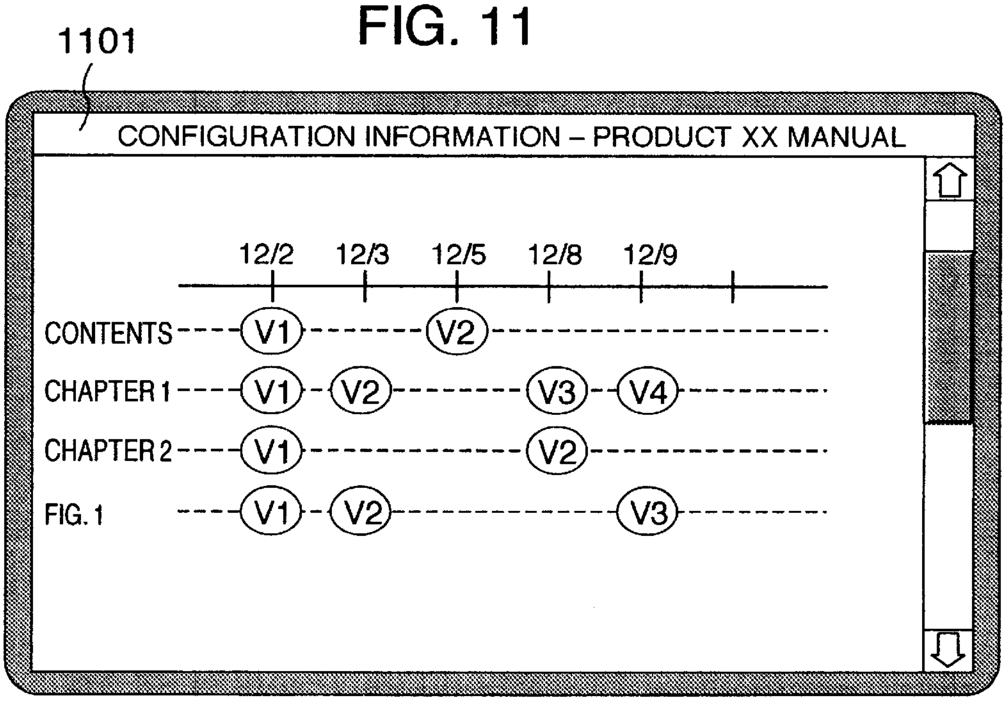
FIG. 11 is a diagram showing a display example of version information and configuration information in the first embodiment in accordance with the present invention.

However, in the embodiment, it is assumed that the version and configuration information of FIGS. 6 and 7 is two-dimensionally displayed as shown in FIG. 11.

Figure 2:
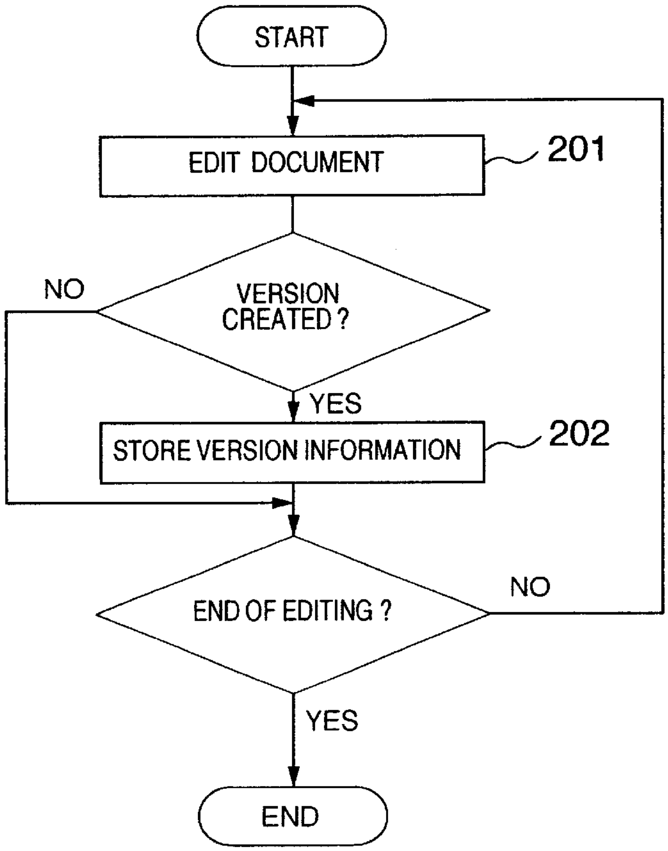
FIG. 2 is a flowchart showing a processing procedure of a version management program in the first embodiment in accordance with the present invention.

FIG. 2 shows a processing procedure of the version management program 105.

In step 201, documents and program sources are edited.

In step 202, when the edited documents and program sources are to be stored with new versions created, the program 105 stores version information including a version name, a creator, and a creation date in the secondary storage 103.

In FIG. 6, 601 indicates version information in which “Table of contents” is edited to be stored as V1 (table of contents of version 1) and then the table of contents of version V1 is further edited to be stored as V2 (table of contents of version 2).

Figure 3:
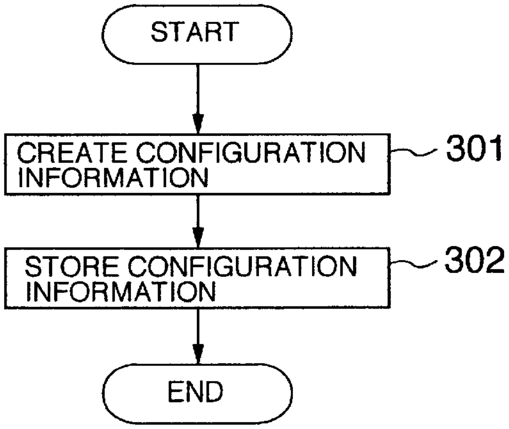
FIG. 3 is a flowchart showing a processing procedure of a configuration management program in the first embodiment in accordance with the present invention.

FIG. 3 shows a processing procedure of the configuration management program 106. This is executed independently of the processing procedure of steps 201 and 202.

In step 301, configuration information is created by the program 106. Namely, there is produced configuration information including a name of a project and an element name and a file name of each constituent element.

To create configuration information, the user may specify the project name and its elements via GUI or the like.

Alternatively, the information may be automatically created from information of the table of contents described in documents.

In step 302, the created information is stored in the secondary storage 103 by the program 106.

FIG. 7 shows the created configuration information including a project name of "Product XX Manual" and element names and file names for its elements "Contents", "Chapter 1", "Chapter 2", and FIG. 1.

Figure 4:
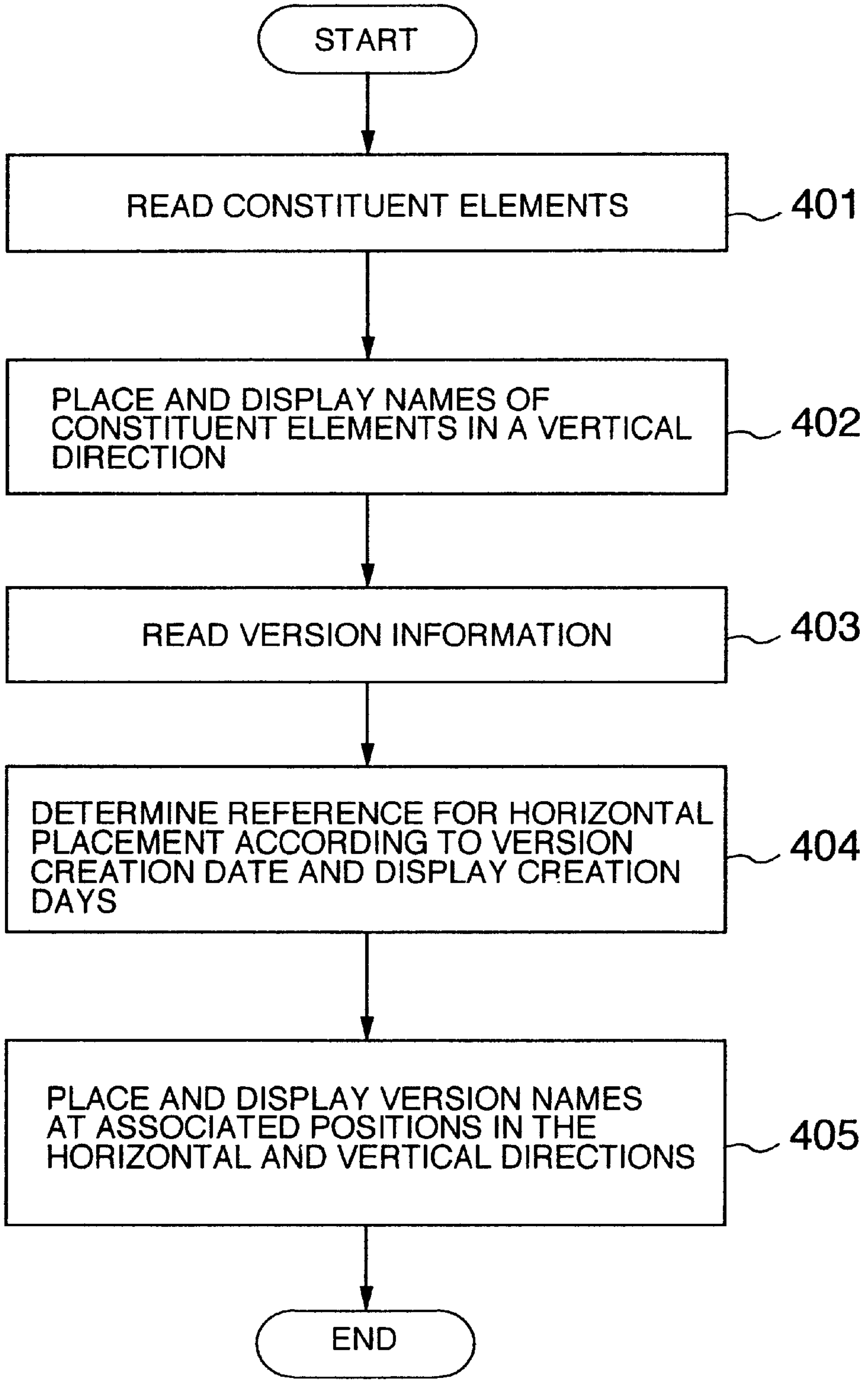
FIG. 4 is a flowchart showing a processing procedure to two-dimensionally display version information and configuration information in the first embodiment in accordance with the present invention.
Figure 5:
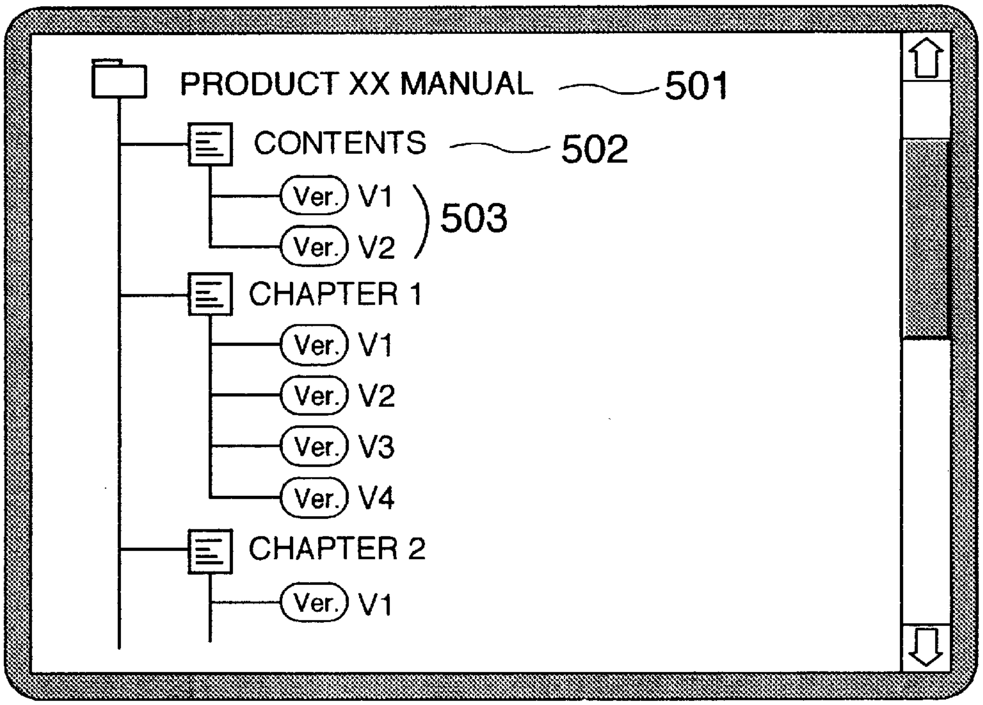
FIG. 5 is a diagram showing a first display example of version information and configuration information in a conventional display method.

FIG. 4 shows a processing procedure of the version/configuration 2D display program 107 to display the version and configuration information stored in steps 202 and 302.

In step 401, the information stored in step 302 is read from the storage 103*a*. There is read the information of FIG. 7.

In step 402, as a reference for placement or placement in the vertical direction, the element names are placed and displayed in the vertical direction.

Figure 12:
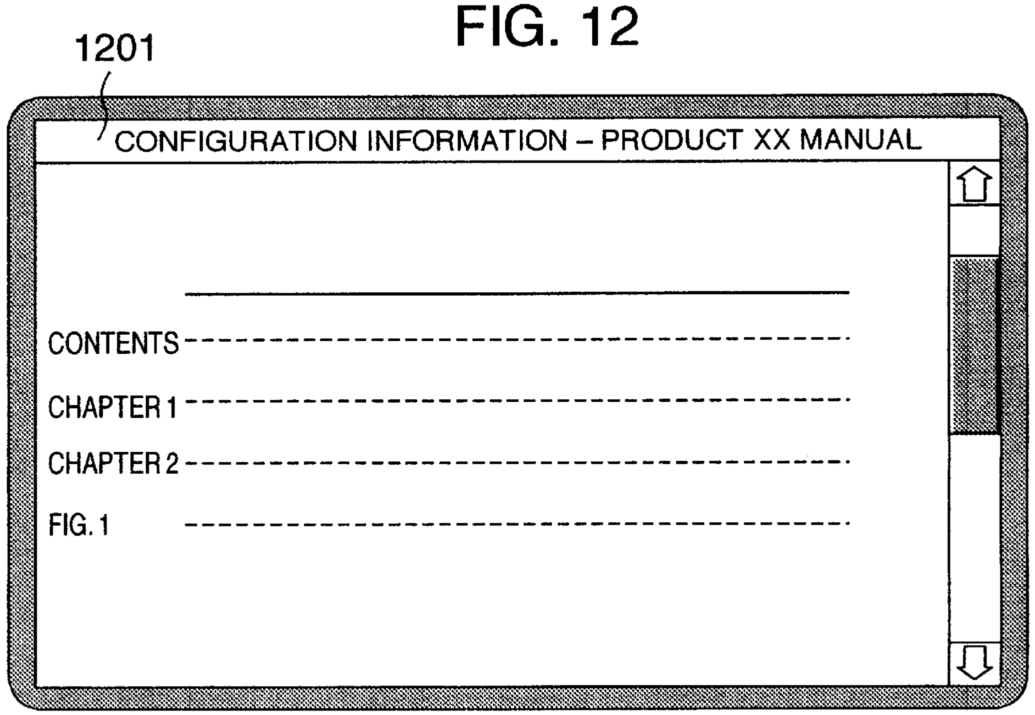
FIG. 12 is a diagram showing a first display process to explain a display method of version information and configuration information in the first embodiment in accordance with the present invention.

For example, the names of FIG. 7 are displayed on the left side of a display area as shown in FIG. 12.

In step 403, version information corresponding to the elements of information read in step 401 is read from the secondary storage 103*b*. There is attained version information indicated as 601 to 604.

In step 404, according to the creation date of version information read in step 403, a reference for placement in the horizontal direction to display an item.

Figure 13:
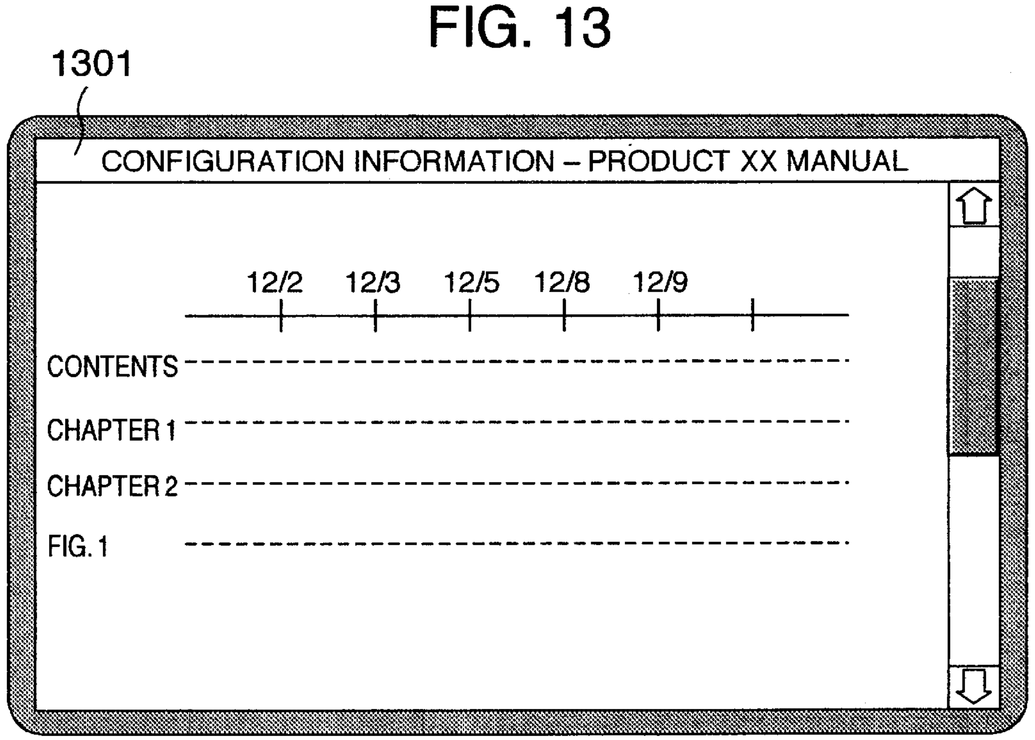
FIG. 13 is a diagram showing a second display process to explain a display method of version information and configuration information in the first embodiment in accordance with the present invention.

This processing is carried out, for example, as follows. When the horizontal placement reference is set to the version creation date, the creation date of each version is acquired from the version information. From the information 601 to 604, the horizontal placement reference is determined as 12/2, 12/3, 12/5, 12/8, and 12/9, which are presented on the upper side of the display area as shown in FIG. 13.

In step 405, version names are placed and displayed at associated positions in the horizontal and vertical directions. For example, "Contents" of "V1" is vertically placed and displayed at a position of "Contents" of the element name and is horizontally placed and displayed at a position of "12/2" for the creation day. Additionally, "Contents" of "V2" is placed and displayed at a position of "12/5".

Through the steps above, the version information and the configuration information can be two-dimensionally displayed as shown in FIG. 11.

Thanks to usage of the display method of this kind, the user can easily recognize how the constituent elements such as documents and program sources of a project are edited and how the elements are related to each other with respect to time. Therefore, for any element of the project, the user can easily restore a version thereof at an arbitrary point of time in the past, and the editing process in the past can be easily attained.

A second embodiment of the present invention will be next described.

The second embodiment is an example of a case in which not only documents and source file names but also particular version names of elements are specified as constituent elements of a project. This differs from the first embodiment in the processing of the version/configuration information 2D display program 107, i.e., the other processing is kept unchanged.

Like the first embodiment, this embodiment includes a CPU 101, a terminal unit 102, a secondary storage 103, a storage medium on which programs are stored, and a processing program 1 to conduct version management and configuration management so as to display information thereof. Moreover, the program 1 includes a version management program 105 to store, each time a document or a program source is edited, version information including a version name and a creation date in the secondary storage 103, a configuration management program 106 to store project configuration information 103*b* in the secondary storage 103, the information 103*b* including a set of a plurality of documents and a plurality of program sources, and a version/configuration information 2D display program 107 to place, when the version information 103*a* and the configuration information 103*b* are read from the storage for the display thereof, information of constituent elements such as documents and program sources of a project in a vertical direction and version information of the elements in a horizontal direction in accordance with the version of the project to thereby display these items in the two-dimensional manner.

A concrete processing procedure of the program 107 of the embodiment will be described by referring to the flowchart of FIG. 14. Additionally, the version information of FIG. 6 and the configuration information of FIG. 9 are used in this processing example.

The processing procedure of the programs 105 and 106 including steps 201 and 202 and steps 301 and 302 are kept unchanged.

Figure 14:
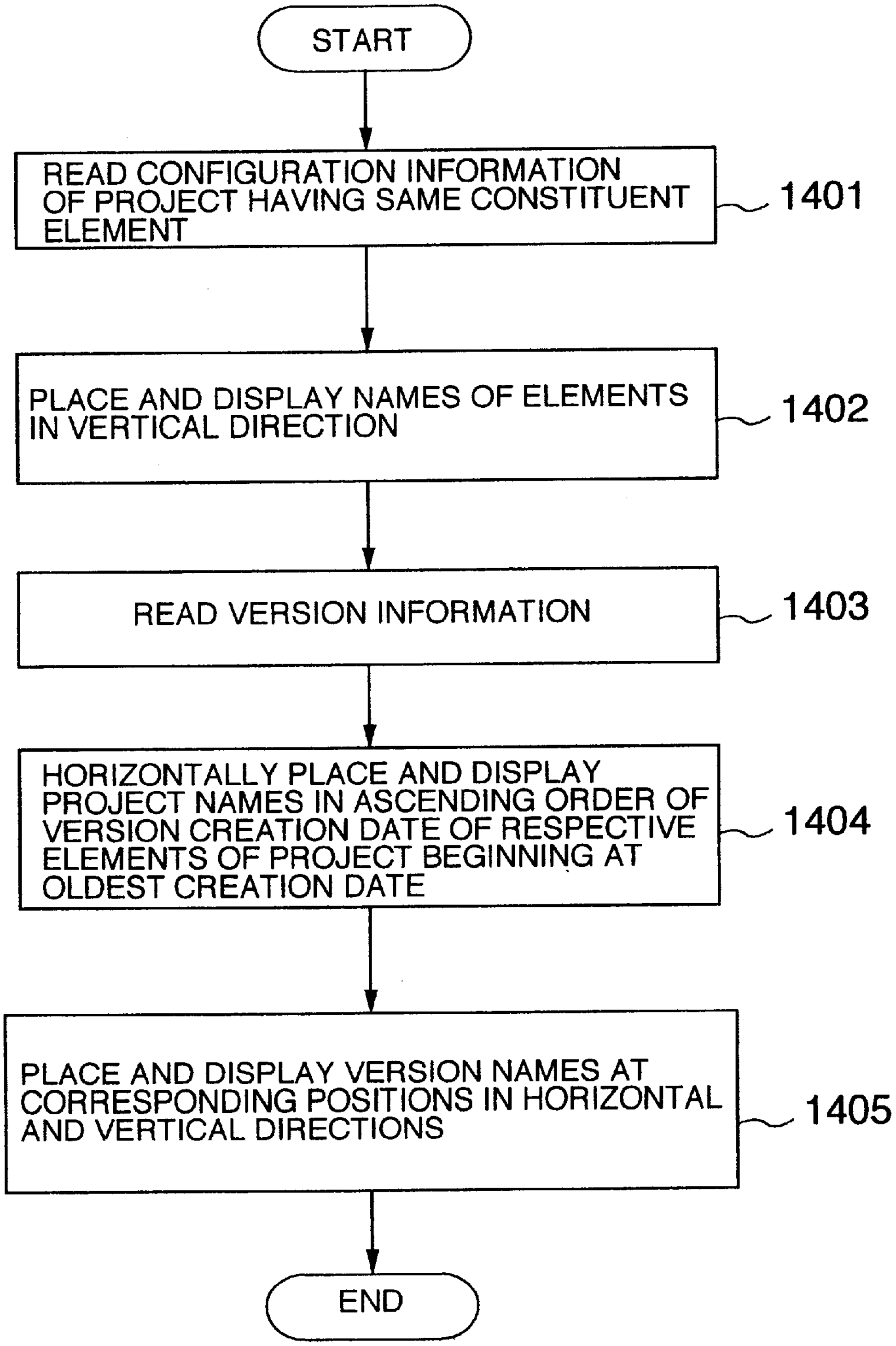
FIG. 14 is a flowchart showing a processing procedure to two-dimensionally display version information and configuration information in the second embodiment in accordance with the present invention.

FIG. 14 shows a processing procedure of the program 107 to display the version and configuration information stored in steps 202 and 302.

In step 1401, from the configuration information stored in the secondary storage 103*a* in step 302, there is obtained configuration information of each version of the project. Information items 901 and 903 of FIG. 9 are read therefrom.

In step 1402, constituent element names of a plurality of projects are placed and displayed in a vertical direction.

In step 1403, version information corresponding to elements of configuration information read in step 1401 are read from the storage 103*b*. Information items 601 to 604 of FIG. 6 are read therefrom.

In step 1404, beginning from the version of the oldest creation data, the constituent elements of projects are placed and displayed with project names in the horizontal direction.

In step 1405, version names are placed and displayed at corresponding positions in the horizontal and vertical directions. For a version other than the constituent elements of the projects, the version name is placed and displayed between those of the elements.

Figure 15:
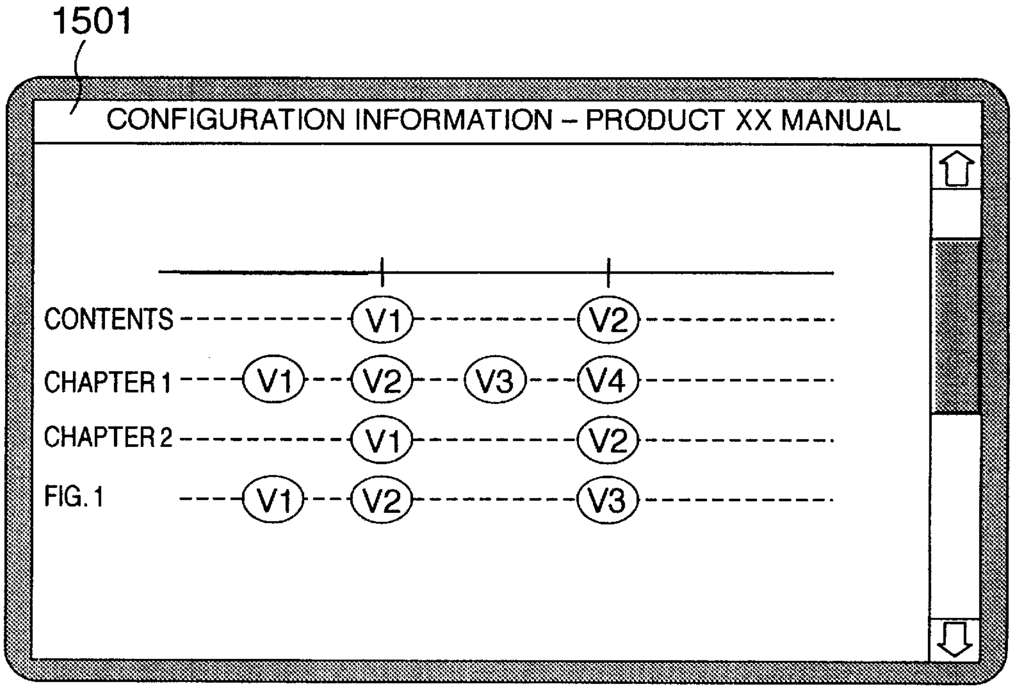
FIG. 15 is a diagram showing a first display example of version information and configuration information in the second embodiment in accordance with the present invention.

Through the steps above, the version information and the configuration information can be two-dimensionally displayed as shown in FIG. 15.

Thanks to usage of the display method of this kind, since the user can easily obtain information such as a relationship between versions of a project and constituent elements thereof, it is possible to easily recognize information, for example, how the editing is conducted through versions of projects. Consequently, the editing of projects can be efficiently achieved.

Figure 16:
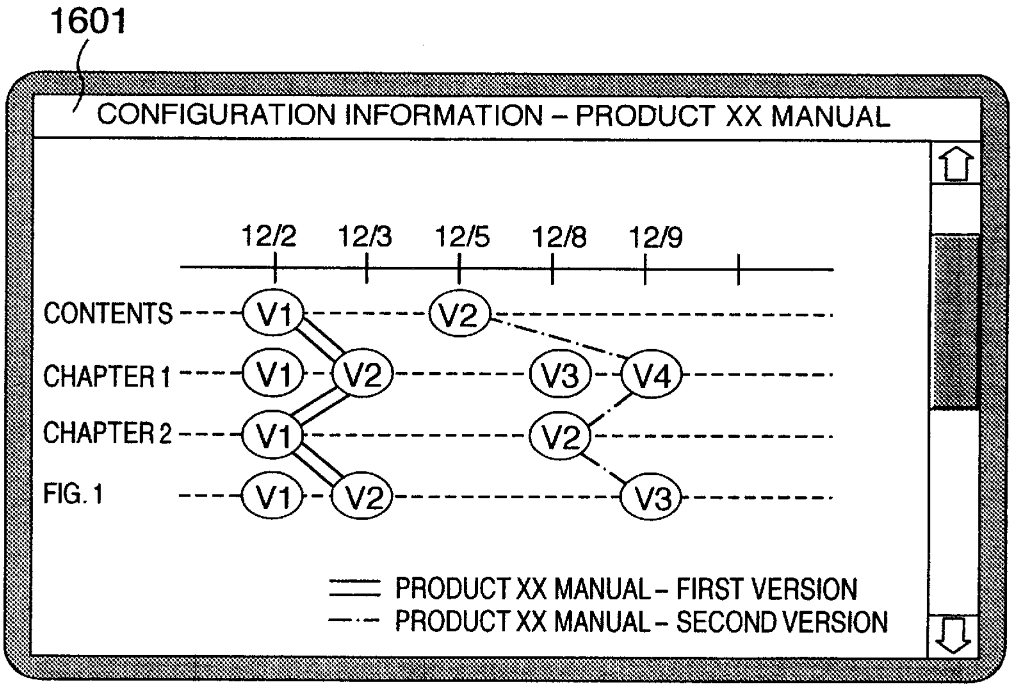
FIG. 16 is a diagram showing a second display example of version information and configuration information in the second embodiment in accordance with the present invention.

Furthermore, in place of the display method of FIG. 15, there may be used a method shown in FIG. 16 in which the project version is added to the display of FIG. 11.

In FIG. 16, the creation date of constituent elements is used as a reference for placement in the horizontal direction, and versions specified as elements of projects are connected to each other via a line. In addition to the linkage, the versions specified as elements of projects each may be, for example, enclosed with a line to display the enclosed areas in different colors.

Thanks to the display of FIG. 16, the user can recognize how the constituent elements such as documents and program sources of projects are edited and how the elements are related to each other with respect to time. Moreover, the user can attain information such as a relationship between a version of a project and the constituent elements of the version.

Figure 17:
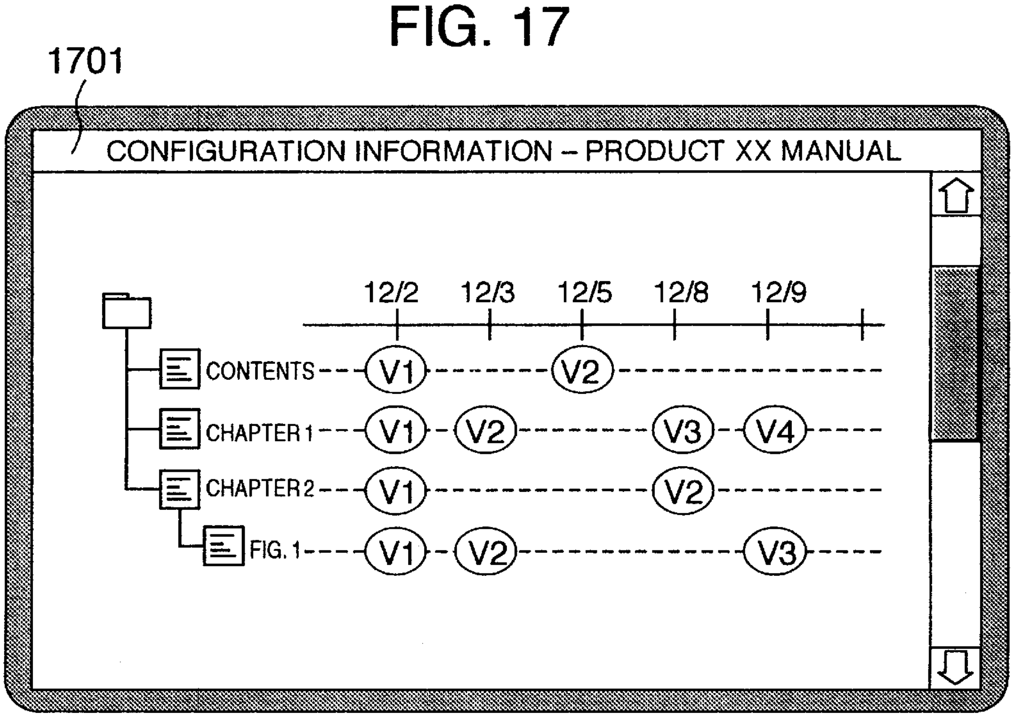
FIG. 17 is a diagram showing a third display example of version information and configuration information in the second embodiment in accordance with the present invention.

Furthermore, FIG. 17 shows an example in which configuration information is placed in a tree structure in accordance with a hierarchical relationship between the constituent elements so as to two-dimensionally display version information of the elements in the horizontal direction.

In this example, "FIG. 1" is used in "Chapter 2", namely, there exists a hierarchical relationship that "FIG. 1" is a sub-element of "Chapter 2". In accordance with the usage of this display method, there can be obtained a hierarchical relationship between the constituent elements and a relationship therebetween with respect to time. For example, it can be recognized that "Chapter 2" is updated at a position indicated as "12/8" and "FIG. 1" used in the update operation is updated at "12/9".

Figure 18:
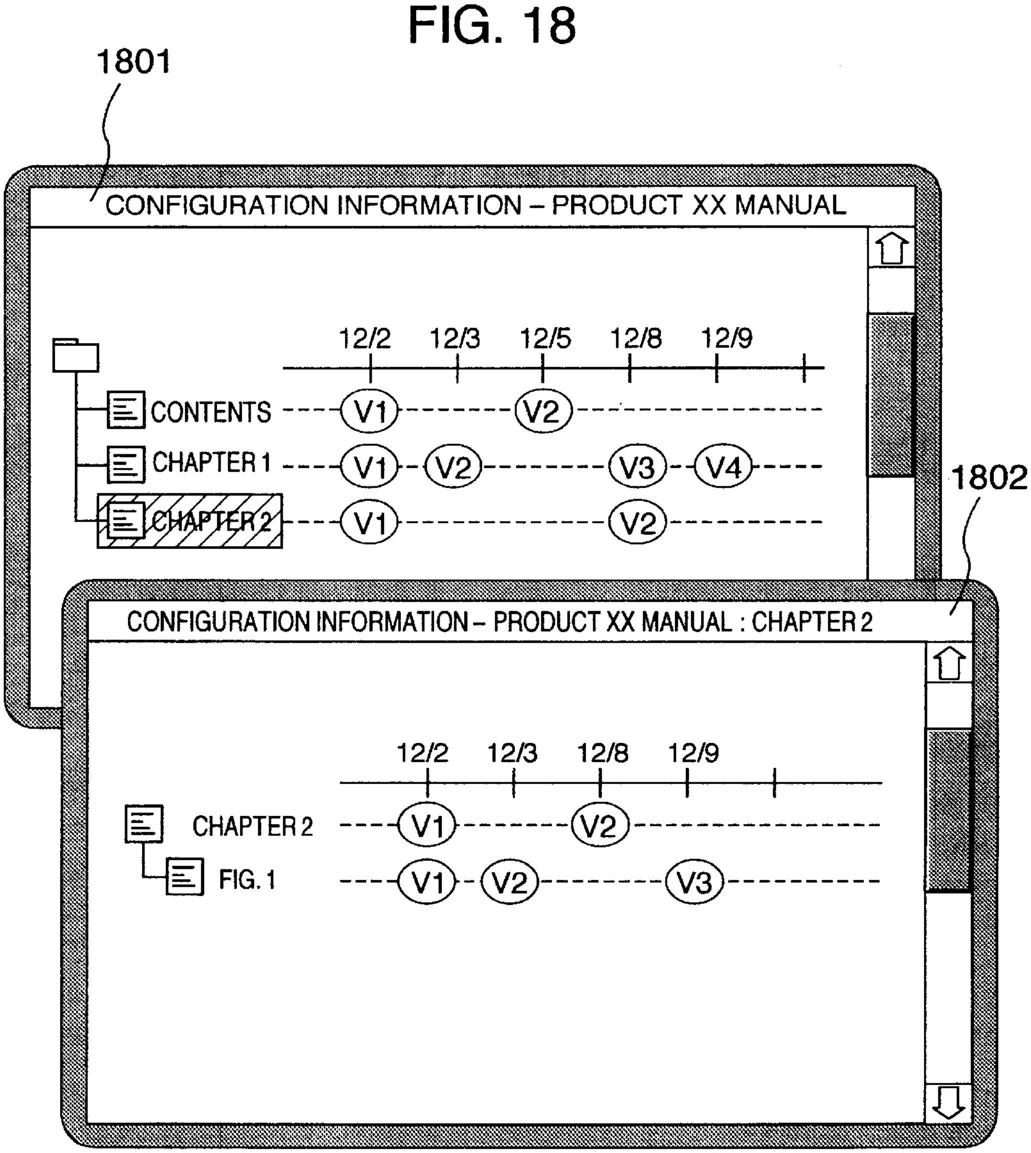
FIG. 18 is a diagram showing a fourth display example of version information and configuration information in the second embodiment in accordance with the present invention.

Additionally, in place of the display method of FIG. 17, there may be used a method in which a certain constituent element is pointed as shown in FIG. 18 to obtain the two-dimensional display of configuration information and version information for the sub-elements thereof.

This is effective when there exist a large number of constituent elements and the display of configuration information in the tree structure is vertically elongated and the overall display cannot be viewed in one screen image at a time.

Description will be given of a third embodiment of the present invention.

In relation to the third embodiment, description will be given of a method of displaying version information and configuration information in a case of, for example, collaborative writing of documents and/or collaborative development of programs in which a configuration management function of projects including sets of documents and program sources is collaboratively operated with a job management function to check or to inspect a state of writing of each document and a state of development of each program source.

Figure 19:
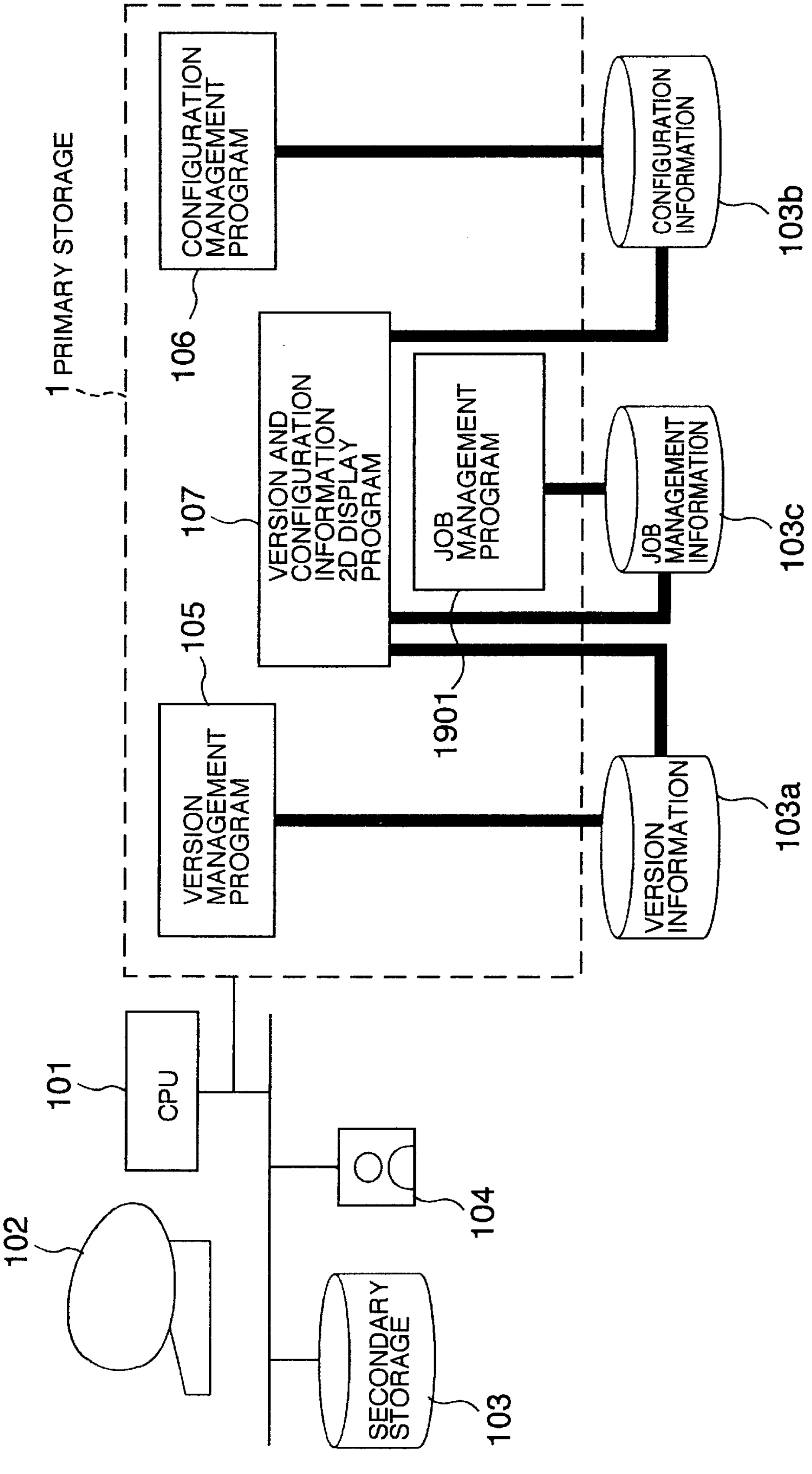
FIG. 19 is a diagram showing constitution of a third embodiment in accordance with the present invention.

FIG. 19 shows constitution of the third embodiment of the present invention.

As shown in the diagram, the embodiment includes, in addition to the configuration (FIG. 1) of the first embodiment, a job management program 1901 to store job management information 103*c* in a storage for the checking or inspection of the writing state of documents and the state of development of program sources, the documents and program sources being constituent elements of the entire project. When displaying version information and configuration information by the version/configuration information 2D display program 107 in this configuration, the job management information 103*c* is read from the storage and is then displayed in combination with the version and configuration information.

The job management information includes, for example, information of a deadline by which such an element of project as a document or a program source is to be submitted and information of an event for each element that the editing thereof is completed for the project.

Figures 20, 21:
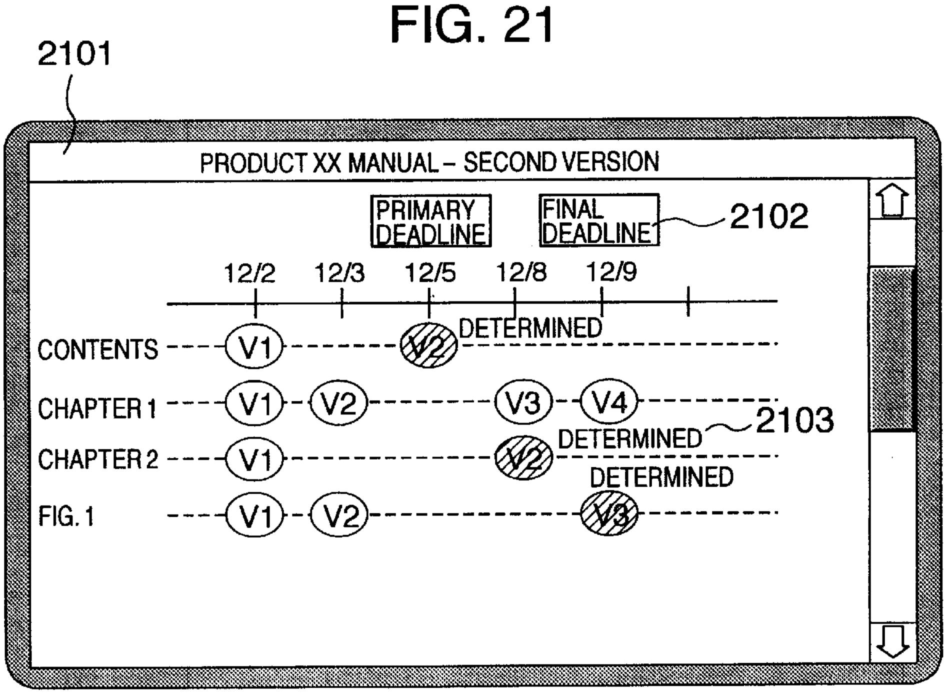
FIG. 20 is a diagram showing an example of configuration information and job management information to explain the third embodiment in accordance with the present invention.
FIG. 21 is a diagram showing a display example of version information and configuration information in the third embodiment in accordance with the present invention.

FIG. 20 shows an example of configuration information and job management information for a project.

In FIG. 20, there are shown, in addition to the project name as configuration information, job management information including deadline information 2002 and an editing mode of element 2003. The editing mode of element is information which indicates that the editing of element is being conducted or "Product XX Manual—Version 2" has been determined. Items of job management information are specified by the user and is stored in a storage by the job management program 1901.

FIG. 21 shows an example in which the job management information is displayed by the display program 107. Deadline information 2102 is displayed along the creation date in the horizontal direction and the editing mode 2103 is displayed, for example, by changing the display format of version information with different colors.

As above, since the job management information is displayed in combination with the two-dimensional display of version information and configuration information, the user can easily recognize the state of writing as well as the state of development.

Description will be given of a fourth embodiment of the present invention.

The fourth embodiment is an example of display in, for example, a program development support system for management of program versions and configurations in which configuration information of programs including several sources and version information of the program sources are displayed.

In contrast with the first to third embodiments in which a project includes several documents and the constituent elements are documents, program sources are assigned as the constituent elements of programs to be developed by the project in the fourth embodiment.

The configuration and the processing procedure of this embodiment are the same as those of the first to fourth embodiments.

Figure 23:
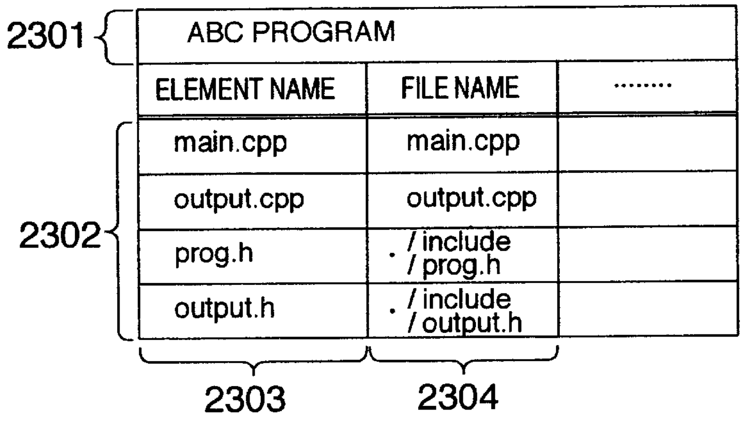
FIG. 23 is a diagram showing an example of configuration information to explain the fourth embodiment in accordance with the present invention.

FIG. 22 shows an example of version information of program sources and FIG. 23 shows an example of configuration information.

In FIG. 23, 2301 indicates a program name as an object of management and 2302 denotes a program source of the program.

Configuration information includes a program source name 2303, a file name corresponding thereto 2304, and the like. The example of FIG. 23 means that "ABC program" includes program sources "main.cpp", "output.cpp", "prog.h", and "output.h".

In FIG. 22, 2201 to 2204 indicate version information respectively corresponding to constituent elements of "ABC program" shown in FIG. 23. Version information includes a version name 2205, a person-in-charge of program of the version 2206, a creation date 2207, etc. FIG. 22 indicates, for example, that "main.cpp" has four versions V1 to V4 (2201).

Figure 24:
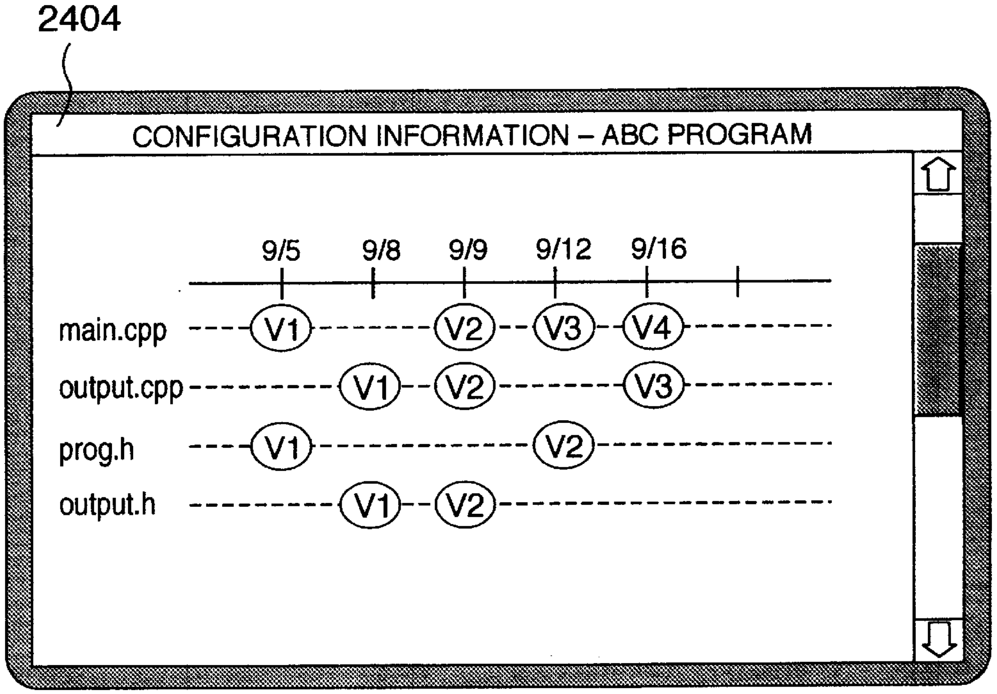
FIG. 24 is a diagram showing a display example of version information and configuration information of the fourth embodiment in accordance with the present invention.

FIG. 24 shows an example in which version information of FIG. 22 and configuration information of FIG. 23 are two-dimensionally displayed in accordance with the procedure of steps 201 and 202, steps 301 and 302, and steps 401 to 405.

Utilizing the display method above, the user can easily recognize how the program sources of the program have been edited and how the sources are related to each other.

For example, the user can easily recognize a relationship between a particular version of cpp file and a header file of a particular version. Therefore, the user can easily select and compile associated sources to restore the program at an arbitrary point of time in the past. Moreover, the process of program development can be easily known.

Similarly, version information of program sources and program configuration information can be two-dimensionally displayed in accordance with a program version by use of the processing procedure of the second embodiment. Therefore, the user can recognize the versions of source programs for each version of the program and the modification in the past of sources for the program of a particular version.

Additionally, job management information such as the deadline of program development can also be displayed in accordance with the configuration and the processing procedure of the third embodiment. This makes it possible to easily obtain the program development state.

In accordance with the version information and configuration information display method of the present invention, the version information and the configuration information can be two-dimensionally displayed in which constituent elements of the project are vertically displayed and versions of the elements are displayed by using the creation date thereof as a reference in the horizontal direction.

With this configuration, it can be easily known how the constituent elements of project such as documents and program sources have been edited and how the elements are associated with each other with respect to time. Accordingly, it is possible to easily restore a version of any element of the project at an arbitrary point of time in the past, and the editing process thereof can be easily known. This increases the efficiency of the collaborative editing job and the like.

When there is employed the two-dimensional display method in which constituent elements of a project is vertically displayed and versions thereof are placed by use of the version of project as a reference in the horizontal direction, the user can easily obtain information, for example, a relationship between a particular version of project and constituent elements of particular versions. Therefore, information about the editing process in the past of projects can be known and hence the efficiency of project editing operation is increased.

Additionally, when there is adopted a two-dimensional display method in which constituent elements of a project are vertically placed in a tree structure in accordance with a hierarchical relationship between the elements and version information of the elements is placed in the horizontal direction, the user can recognize, for example, a relationship between versions of an element and sub-elements thereof. Consequently, it is possible to increase the efficiency when editing documents and the like having a hierarchical relationship.

Furthermore, when there is displayed job management information to check the writing state of the project and documents as constituent elements thereof and the development state of program sources together with the version information and the configuration information in a two-dimensional fashion, the user can easily obtain information of the editing process in the past of the elements of the project and the writing state and the development state. This consequently increases the efficiency of the job management in, for example, the collaborative editing job.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A version information display method for use with a document management system including a display and a storage, comprising:

storing, each time a plurality of documents are edited, version information including a version name thereof and a creation date thereof and configuration information of a project resulting in a plurality of documents or a set thereof in said storage; and reading said version information and the configuration information of said project from the storage, placing and displaying information of constituent elements of documents configuring the project on said display in a vertical direction, and placing and displaying version information of each of the constituent elements thereon by using the creation date as a reference to vertically align between relevant constituent elements and arranged time-sequentially in a horizontal direction.

2. The version information display method according to claim 1, wherein the display step uses, in place of the creation date, a version of the project as the reference.

3. The version information display method according to claim 1, wherein the displaying includes, in place of the step of placing and displaying information of constituent elements of documents configuring the project in a vertical direction, the step of placing and displaying information of constituent elements of documents configuring the project in a tree structure in a vertical direction according to a hierarchic relationship between the constituent elements.

4. The version information display method according to claim 1, further comprising the step of storing, in the storage, job management information for display of a state of writing documents as an overall project and constituent elements thereof, wherein the displaying further comprises reading the job management information from the storage and placing and displaying the job management information on the display.

5. A version information display apparatus for managing version information of documents and configuration information of a project resulting in a plurality of documents or set thereof, comprising:

storage means for storing, each time a plurality of documents are edited, version information including a version name thereof and a creation date thereof and configuration information of the project resulting in a plurality of documents or a set thereof; and display means for reading the version information and the configuration information of the project from the storage, placing and displaying information of constituent elements of documents configuring the project on a display in a vertical direction, and placing and displaying version information of each of the constituent elements thereon by using the creation date as a reference to vertically align between relevant constituent elements and arranged time-sequentially in a horizontal direction.

6. The version information display apparatus according to claim 5, wherein said display means uses, in place of the creation date, a version of the project as the reference.

7. The version information display apparatus according to claim 5, wherein said display means conducts, in place of the placing and displaying information of constituent elements of documents configuring the project in a vertical direction, placing and displaying information of constituent elements of documents configuring the project in a tree structure in a vertical direction according to a hierarchic relationship between the constituent elements.

8. The version information display apparatus according to claim 5, further including means for storing, in the storage, job management information for display of a state of writing documents as an entire project and constituent elements thereof, wherein said display means reads the job management information from the storage and places and displays the job management information on the display.

9. A computer program for implementing a version information display method for use with a document management system including a display and a storage, said computer program when executed causing the document management system to perform:

storing, each time a plurality of documents are edited, version information including a version name thereof and a creation date thereof and configuration information of a project resulting in a plurality of documents or a set thereof in said storage; and reading said version information and the configuration information of said project from the storage, placing and displaying information of constituent elements of documents configuring the project on said display in a vertical direction, and placing and displaying version information of each of the constituent elements thereon by using the creation date as a reference to vertically align between relevant constituent elements and arranged time-sequentially in a horizontal direction.

10. The computer program according to claim 9, wherein the displaying uses, in place of the creation date, a version of the project as the reference.

11. The computer program according to claim 9, wherein the displaying conducts, in place of the placing and displaying information of constituent elements of documents configuring the project in a vertical direction, placing and displaying information of constituent elements of documents configuring the project in a tree structure in a vertical direction according to a hierarchic relationship between the constituent elements.

12. The computer program according to claim 9, further causing the document management system to perform storing, in the storage, job management information for display of a state of writing documents as an entire project and constituent elements thereof, wherein the displaying reads the job management information from the storage and places and displays the job management information on the display.

13. A version information display method for use with a document management system including a display and a storage, comprising:

storing, each time a plurality of documents are edited, version information including a version name thereof and a creation date thereof and configuration information of a project resulting in a plurality of documents or a set thereof in said storage; and reading said version information and the configuration information of said project from the storage, placing and displaying information of constituent elements of documents configuring the project on said display in a vertical direction, and placing and displaying version information of each of the constituent elements thereon by using the creation date as a reference to vertically align between relevant constituent elements and arranged event-sequentially in a horizontal direction.

14. The version information display method according to claim 13, wherein the display step uses, in place of the creation date, a version of the project as the reference.

15. The version information display method according to claim 13, wherein the displaying includes, in place of the step of placing and displaying information of constituent elements of documents configuring the project in a vertical direction, the step of placing and displaying information of constituent elements of documents configuring the project in a tree structure in a vertical direction according to a hierarchic relationship between the constituent elements.

16. The version information display method according to claim 13, further comprising the step of storing, in the storage, job management information for display of a state of writing documents as an overall project and constituent elements thereof, wherein the displaying further comprises reading the job management information from the storage and placing and displaying the job management information on the display.

17. A version information display apparatus for managing version information of documents and configuration information of a project resulting in a plurality of documents or set thereof, comprising:

storage means for storing, each time a plurality of documents are edited, version information including a version name thereof and a creation date thereof and configuration information of the project resulting in a plurality of documents or a set thereof; and display means for reading the version information and the configuration information of the project from the storage, placing and displaying information of constituent elements of documents configuring the project on a display in a vertical direction, and placing and displaying version information of each of the constituent elements thereon by using the creation date as a reference to vertically align between relevant constituent elements and arranged event-sequentially in a horizontal direction.

18. The version information display apparatus according to claim 17, wherein said display means uses, in place of the creation date, a version of the project as the reference.

19. The version information display apparatus according to claim 17, wherein said display means conducts, in place of the placing and displaying information of constituent elements of documents configuring the project in a vertical direction, placing and displaying information of constituent elements of documents configuring the project in a tree structure in a vertical direction according to a hierarchic relationship between the constituent elements.

20. The version information display apparatus according to claim 17, further including means for storing, in the storage, job management information for display of a state of writing documents as an entire project and constituent elements thereof, wherein said display means reads the job management information from the storage and places and displays the job management information on the display.

21. A computer program for implementing a version information display method for use with a document management system including a display and a storage, said computer program when executed causing the document management system to perform:

storing, each time a plurality of documents are edited, version information including a version name thereof and a creation date thereof and configuration information of a project resulting in a plurality of documents or a set thereof in said storage; and reading said version information and the configuration information of said project from the storage, placing and displaying information of constituent elements of documents configuring the project on said display in a vertical direction, and placing and displaying version information of each of the constituent elements thereon by using the creation date as a reference to vertically align between relevant constituent elements and arranged event-sequentially in a horizontal direction.

22. The computer program according to claim 21, wherein the displaying uses, in place of the creation date, a version of the project as the reference.

23. The computer program according to claim 21, wherein the displaying conducts, in place of the placing and displaying information of constituent elements of documents configuring the project in a vertical direction, placing and displaying information of constituent elements of documents configuring the project in a tree structure in a vertical direction according to a hierarchic relationship between the constituent elements.

24. The computer program according to claim 21, further causing the document management system to perform storing, in the storage, job management information for display of a state of writing documents as an entire project and constituent elements thereof, wherein the displaying reads the job management information from the storage and places and displays the job management information on the display.

* * * * *